(12) United States Patent
Le et al.

(10) Patent No.: US 10,814,817 B2
(45) Date of Patent: Oct. 27, 2020

(54) OCCUPANT POSITION DETECTION (71) Applicant: Ford Global Technologies, LLC, Dearborn, MI (US)

(72) Inventors: Jialiang Le, Canton, MI (US); Robert William McCoy, Ann Arbor, MI (US); Saeed David Barbat, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 230 days.

(21) Appl. No.: 15/623,483

(22) Filed: Jun. 15, 2017

(65) Prior Publication Data
US 2018/0361974 A1 Dec. 20, 2018

(51) Int. Cl.
| | |
|---|---|
| *B60R 21/015* | (2006.01) |
| *B60N 2/00* | (2006.01) |
| *B60R 22/04* | (2006.01) |
| *B60R 21/01* | (2006.01) |

(52) U.S. Cl.
CPC ........ B60R 21/01544 (2014.10); B60N 2/002 (2013.01); B60R 21/01532 (2014.10); B60R 21/01534 (2014.10); B60R 21/01536 (2014.10); B60R 21/01554 (2014.10); B60R 22/04 (2013.01); *B60R 2021/01272* (2013.01); *B60R 2021/01286* (2013.01)

(58) Field of Classification Search
CPC ........ B60R 21/01532; B60R 21/01534; B60R 21/01536; B60R 21/01544; B60R 21/01554; B60R 22/04; B60R 2021/01272; B60R 2021/01286
See application file for complete search history.

(56) References Cited

U.S. PATENT DOCUMENTS

| | | | | |
|---|---|---|---|---|
| 5,413,378 | A | | 5/1995 | Steffens et al. |
| 5,628,230 | A | * | 5/1997 | Flam ............... G01M 17/0078 73/172 |
| 5,822,707 | A | * | 10/1998 | Breed ................. B60R 25/25 701/49 |
| 5,927,752 | A | | 7/1999 | Brandin |
| 6,198,998 | B1 | * | 3/2001 | Farmer ............... B60N 2/002 340/438 |
| 6,466,849 | B2 | | 10/2002 | Kamiji et al. |

(Continued)

FOREIGN PATENT DOCUMENTS

| | | |
|---|---|---|
| CN | 104786976 B | 1/2016 |
| DE | 3802159 A1 | 8/1989 |

(Continued)

OTHER PUBLICATIONS

Search Report from United Kingdom Intellectual Property Office dated Nov. 27, 2018 regarding Application No. GB1809711.3 (4 pages).

*Primary Examiner* — Donald J Wallace
(74) *Attorney, Agent, or Firm* — Frank A. MacKenzie; Bejin Bieneman PLC (57) ABSTRACT

A computing device in a vehicle can be programmed to receive an occupant position measurement from at least one of an acoustic and a light sensor, determine an estimated occupant size based on occupant weight, estimate a vehicle seat position based on the occupant position measurement, and, control a vehicle occupant safety device based on the estimated occupant size and estimated vehicle seat position.

20 Claims, 6 Drawing Sheets

(56) References Cited

U.S. PATENT DOCUMENTS

| | | |
|---|---|---|
| 6,910,711 B1 | 6/2005 | Breed et al. |
| 7,236,865 B2 | 6/2007 | Prakah-Asante et al. |
| 9,434,349 B1* | 9/2016 | Perkins .................. B60R 22/48 |
| 9,919,670 B2* | 3/2018 | Le ..................... B60R 21/01516 |
| 9,931,964 B2* | 4/2018 | Le ........................... B60N 2/002 |
| 2004/0153229 A1* | 8/2004 | Gokturk ............. G06K 9/00362 |
| | | 701/45 |
| 2004/0216939 A1* | 11/2004 | Lorenz ................. B60R 21/015 |
| | | 180/268 |
| 2005/0114108 A1* | 5/2005 | Cooper ................ G05B 13/021 |
| | | 703/8 |
| 2005/0154515 A1* | 7/2005 | Wallace ............. G06K 9/00362 |
| | | 701/45 |
| 2005/0179239 A1* | 8/2005 | Farmer ............. G06K 9/00362 |
| | | 280/735 |
| 2007/0007066 A1 | 1/2007 | Mertz |
| 2007/0135982 A1 | 6/2007 | Breed et al. |
| 2007/0182140 A1 | 8/2007 | Baur et al. |
| 2012/0018608 A1* | 1/2012 | Nishide .................. B60N 2/067 |
| | | 248/429 |
| 2012/0053794 A1* | 3/2012 | Alcazar ............... B60N 2/0244 |
| | | 701/48 |
| 2016/0110595 A1* | 4/2016 | Wang ................. G06K 9/00375 |
| | | 705/27.2 |
| 2016/0311399 A1* | 10/2016 | Miller .................. B60R 16/037 |
| 2016/0347271 A1* | 12/2016 | Kuehne ............... B60N 2/0244 |

FOREIGN PATENT DOCUMENTS

| | | | | |
|---|---|---|---|---|
| GB | 2370543 A | * | 7/2002 | ............ B60R 21/01 |
| KR | 101355567 B1 | | 1/2014 | |
| WO | WO 0144026 A1 | | 6/2001 | |

* cited by examiner

OCCUPANT POSITION DETECTION

BACKGROUND

Vehicles can be equipped to operate in both autonomous and occupant piloted mode. Vehicles can be equipped with computing devices, networks, sensors and controllers to acquire information regarding the vehicle's environment and to pilot the vehicle based on the information. A computing device can also be equipped with computing devices, networks, sensors and controllers to acquire information regarding the vehicle's occupants and to pilot the vehicle based on the information. Vehicles in autonomous mode can provide occupants with the ability to move seating around to socialize, recline seats to sleep or view video screens, free from the need to watch the roadway.

DETAILED DESCRIPTION

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering.

Disclosed herein is a method, comprising: receiving an occupant position measurement from at least one of an acoustic and a light sensor, determining an estimated occupant size based on occupant weight, estimating a vehicle seat position based on the occupant position measurement and estimated occupant size, and, controlling a vehicle occupant safety device based on the estimated occupant size and estimated vehicle seat position. the estimated occupant size can be determined based on two anthropomorphic models, a first anthropomorphic model corresponding to an adult male model and a second anthropomorphic model corresponding to an adult female model. Which anthropomorphic model the occupant position most likely matches can be determined based on determining occupant weight, including adult male model, adult female model, or no model. The estimated vehicle seat position can be determined based on the occupant position measurement and the determined anthropomorphic model.

A vehicle seat position can be estimated including determining whether the occupant position measurement is consistent with the determined anthropomorphic model and a seat located at a mid-track position. The occupant position measurement can be determined based on transmitting infrared light or ultrasonic waves from a vehicle dashboard in a direction and with a field of view that intercepts the occupant, at the vehicle seat position. The vehicle occupant safety device can be controlled including determining retractor force for a passive restraint, wherein determining the retractor force for a passive restraint can be based on which anthropomorphic model is matched. Retractor force for an active restraint can be determined when no anthropomorphic model is matched to be a default retractor force. The vehicle seat position based on determining an estimated seat track position and an estimated seat back angle, wherein a seat mid-track position is indicated based on the estimated seat track position and the estimated seat back angle and the occupant position measurement including a predetermined tolerance and wherein the occupant position measurement is made between a portion of a vehicle dashboard and points in a field of view that includes a chest portion of one or more adult anthropomorphic models and the one or more adult anthropomorphic models include a $5^{th}$ percentile female adult anthropomorphic model and a $50^{th}$ percentile adult male anthropomorphic model. Controlling a vehicle occupant safety device can be based on matching the occupant distance measurement with a $5^{th}$ percentile female adult anthropomorphic model, a $50^{th}$ percentile adult male anthropomorphic model if the distance measurement indicates a seat mid-track position.

Further disclosed is a computer readable medium storing program instructions for executing some or all of the above method steps. Further disclosed is a computer programmed for executing some or all of the above method steps, including a computer apparatus, programmed to receive an occupant position measurement from at least one of an acoustic and a light sensor, determine an estimated occupant size based on occupant weight, estimate a vehicle seat position based on the occupant position measurement and estimated occupant size, and, control a vehicle occupant safety device based on the estimated occupant size and estimated vehicle seat position. the estimated occupant size can be determined based on two anthropomorphic models, a first anthropomorphic model corresponding to an adult male model and a second anthropomorphic model corresponding to an adult female model. Which anthropomorphic model the occupant position most likely matches can be determined based on determining occupant weight, including adult male model, adult female model, or no model.

The computer can be programmed to estimate the vehicle seat position based on the occupant position measurement and the determined anthropomorphic model. A vehicle seat position can be estimated including determining whether the occupant position measurement is consistent with the determined anthropomorphic model and a seat located at a mid-track position. The occupant position measurement can be determined based on transmitting infrared light or ultrasonic waves from a vehicle dashboard in a direction and with a field of view that intercepts the occupant, at the vehicle seat position. The vehicle occupant safety device can be controlled including determining retractor force for a passive restraint, wherein determining the retractor force for a passive restraint can be based on which anthropomorphic model is matched. Retractor force for an active restraint can be determined when no anthropomorphic model is matched to be a default retractor force.

The computing device can be programmed to determine a vehicle seat position based on determining an estimated seat track position and an estimated seat back angle, wherein a seat mid-track position is indicated based on the estimated seat track position and the estimated seat back angle and the occupant position measurement including a predetermined tolerance and wherein the occupant position measurement is made between a portion of a vehicle dashboard and points in a field of view that includes a chest portion of one or more adult anthropomorphic models and the one or more adult anthropomorphic models include a $5^{th}$ percentile female adult anthropomorphic model and a $50^{th}$ percentile adult male anthropomorphic model. Controlling a vehicle occupant safety device can be based on matching the occupant distance measurement with a $5^{th}$ percentile female adult anthropomorphic model, a $50^{th}$ percentile adult male anthropomorphic model if the distance measurement indicates a seat mid-track position.

Figure 1:
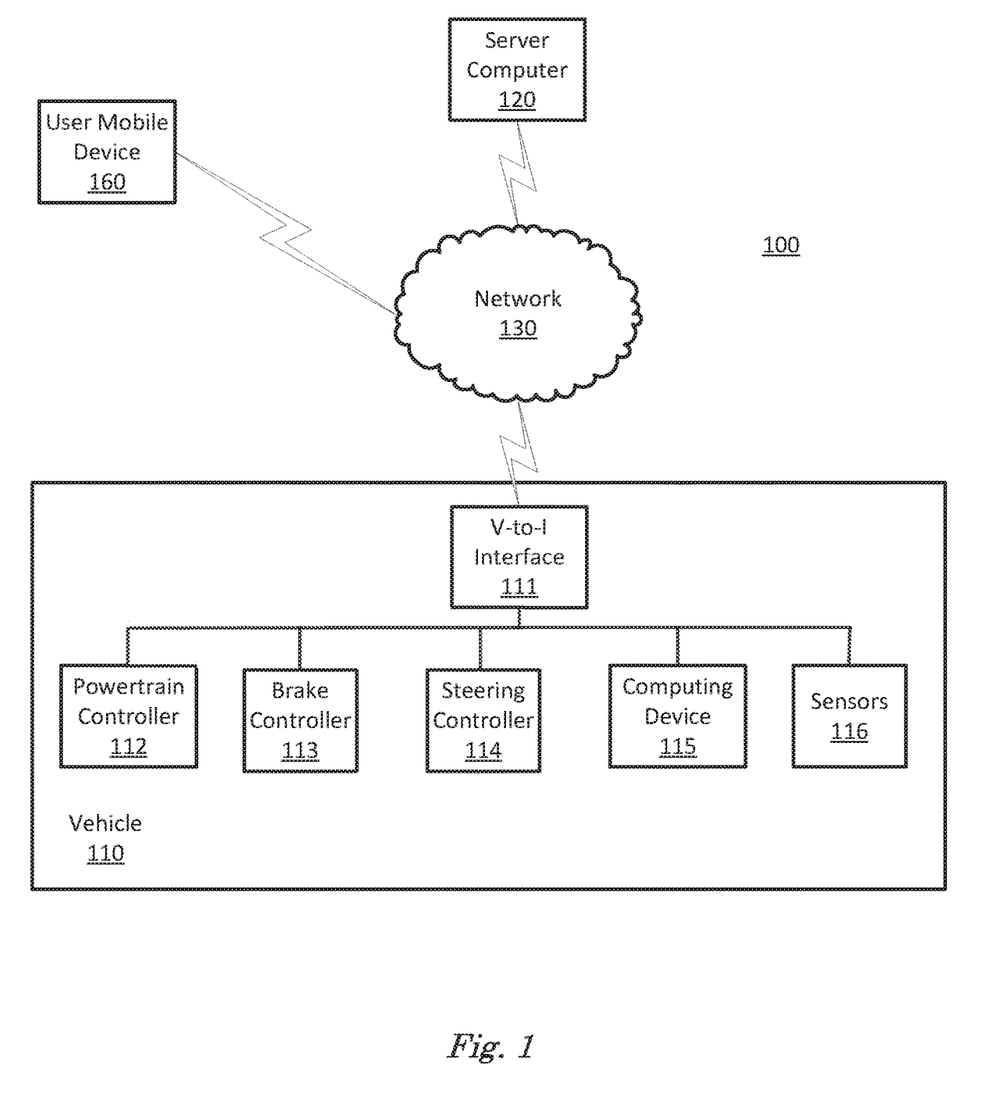
FIG. 1 is a block diagram of an example vehicle.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode in accordance with disclosed implementations. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, where examples of environmental data include data about weather conditions, the grade of a road, the location of a road or locations of neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110.

Figure 2:
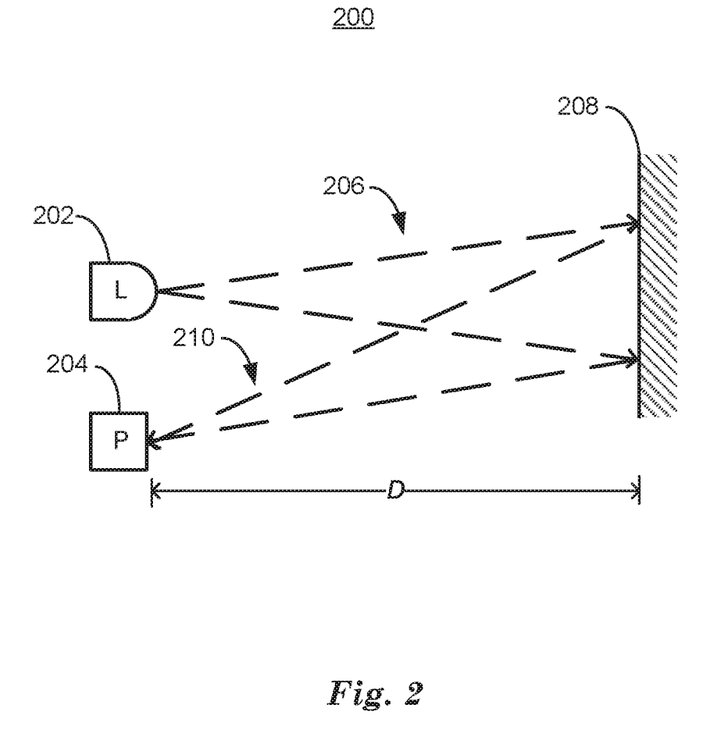
FIG. 2 is a diagram of an example infrared emitter and receiver.

FIG. 2 is a diagram of an infrared (IR) LIDAR 200 that determines a distance D to a surface 208. IR LIDAR 200 can determine range or distance to objects by directing an IR light emitting diode (LED) 202 (labeled L) emitting pulses of IR light in a field of projection 206 that reflect from a surface 208 and are received by an IR photodiode 204 (labeled P), having a field of view 210 that overlaps the field of projection 206 at the surface 208. The IR LIDAR 200 can determine the distance D by determining the elapsed time for an IR pulse to travel from IR LED 202, reflect from surface 208, and travel back to IR photodiode 204. Since light travels about 30 centimeters (cm)/nanosecond (ns), determining the elapsed pulse time to within one ns can determine a distance D with a resolution of +/−30 cm, for example. Higher pulse time resolutions can be used to determine distances with higher resolution. For example, pulse time resolution of 10 picoseconds (ps) can yield distance resolution of +/−3 millimeters (mm).

IR LIDAR 200 emits pulses of IR light in a field of projection 206. The field of projection 206 is a representation of the spatial distribution of IR light energy emitted by IR LED 202. The spatial distribution of IR light energy emitted by IR LED 202 is a function of the diode junction that forms the light-emitting portion of IR LED 202 and optical components included in IR LED 202. Optical components can include lenses, filters, etc. that shape the output of the light emitting portion of IR LED 202 into a field of projection 206, which can be a graphical representation of IR light emission above a predetermined level. The field of projection 206 can be shaped by optics included in IR LED 202 to project a pulse of IR light onto a surface 208 at a predetermined distance with a predetermined size and shape. This permits optics included in IR photodiode 204 to determine a field of view 210 for IR photodiode 204 that overlaps the field of projection 206 and thereby permits IR photodiode 204 to acquire light energy from the pulse of IR light emitted by IR LED 202 and thereby permits IR LIDAR 200 to determine a distance D by determining elapsed pulse time.

IR LIDAR 200 can be designed and constructed to be mounted in an instrument panel, e.g., in a dashboard, in an interior portion of a vehicle 110, and can have pulse energy and pulse time resolution appropriate to emit IR pulses in a field of projection 206 and detect IR pulses in a field of view 210 to determine distance D from the IR LIDAR 200 to an occupant or anthropomorphic model of an occupant seated in the vehicle 110. An anthropomorphic model of an occupant is a physical model (e.g. "crash test dummy") that is constructed so that the size and proportions of the anthropomorphic model are equal to statistical averages of populations of humans. For example, adult male and adult female populations can be measured and the results processed statistically to yield average size and proportions for adult males and adult females divided into percentiles by size. A representative adult male anthropomorphic model can be determined by selecting an anthropomorphic model representing the $50^{th}$ percentile in size and a representative adult female anthropomorphic model representing the $5^{th}$ percentile in size, for example.

Figure 3:
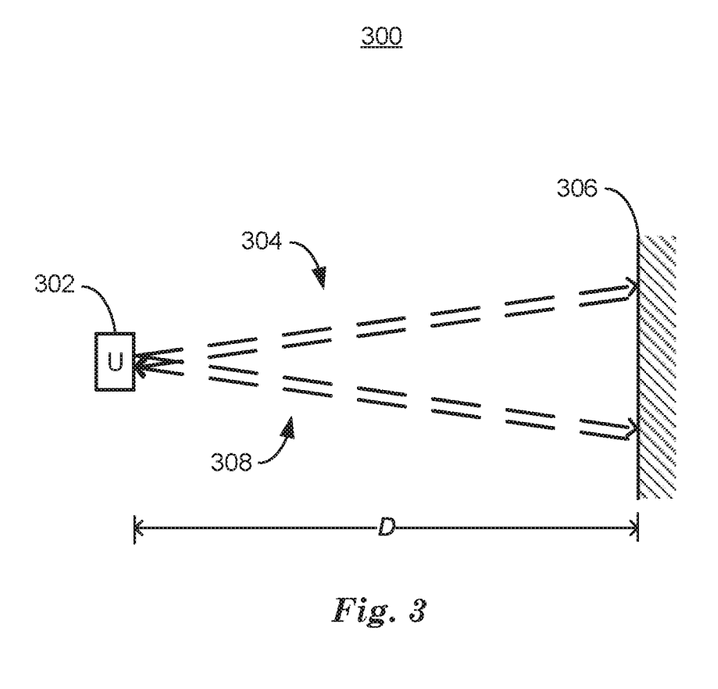
FIG. 3 is a diagram of an example ultrasound transceiver.

FIG. 3 is a diagram of an ultrasonic range detector 300 that includes an ultrasound transceiver 302. Ultrasound transducer 302 can include a crystal-based transducer that can emit ultrasonic waves in air based on input electrical voltages and currents, and that can create output electrical voltages and currents based on received ultrasonic waves. Ultrasound range detector 300 can include a single ultrasound transducer 302 to both transmit and receive ultrasonic waves, or can have separate transmit and receive transducers. The ultrasound transducer 302 can be configured to emit ultrasonic waves in a field of projection 304 (dashed lines) that can reflect from a surface 306. The ultrasound transducer can also create electrical signals from the reflected ultrasonic waves impinging upon the ultrasound transducer from the field of view 308 of the ultrasound transceiver 302. Ultrasonic waves refer to sound waves beyond the range of human hearing, namely about 20K Hz. Ultrasonic waves have properties that vary with the frequency of the waves. For example, air attenuates ultrasound as a function of frequency, making low frequency ultrasound (<100 K Hz) preferable for range detectors designed to operate in air.

Ultrasound transducer 302 can determine a distance D to a surface 306 by emitting a pulse of ultrasonic waves in a field of projection 304. The ultrasound transducer 302 can be designed to emit ultrasonic waves in a field of projection 304 having a predetermined size and shape at a predetermined distance. The field of view 308 of the ultrasound transducer 302 can be designed to overlap the field of projection 304 and thereby permit ultrasound transducer 302 to emit a pulse of ultrasonic waves, and create an electrical signal based on receiving the pulse of ultrasonic waves reflected by a surface 306 and determining the elapsed pulse time for the pulse to travel from the ultrasound transducer 302 to the surface 306 and back. Since sound travels at 343 meters (m)/s in dry air at sea level at 20° C., the distance D can be determined by measuring the elapsed pulse time at the appropriate resolution as discussed above in relation to FIG. 2.

Ultrasound range detector 300 can be designed and constructed to be mounted in a dashboard of an interior portion of a vehicle 110 and have ultrasonic pulse energy and pulse time resolution appropriate to emit ultrasonic pulses in a field of projection 304 and detect ultrasonic pulses in a field of view 308 to determine a distance D from the ultrasound range detector 300 to an occupant or anthropomorphic model of an occupant seated in vehicle 110. The anthropomorphic model can be and adult male anthropomorphic model or an adult female anthropomorphic model as discussed above in relation to FIG. 2.

Figure 4:
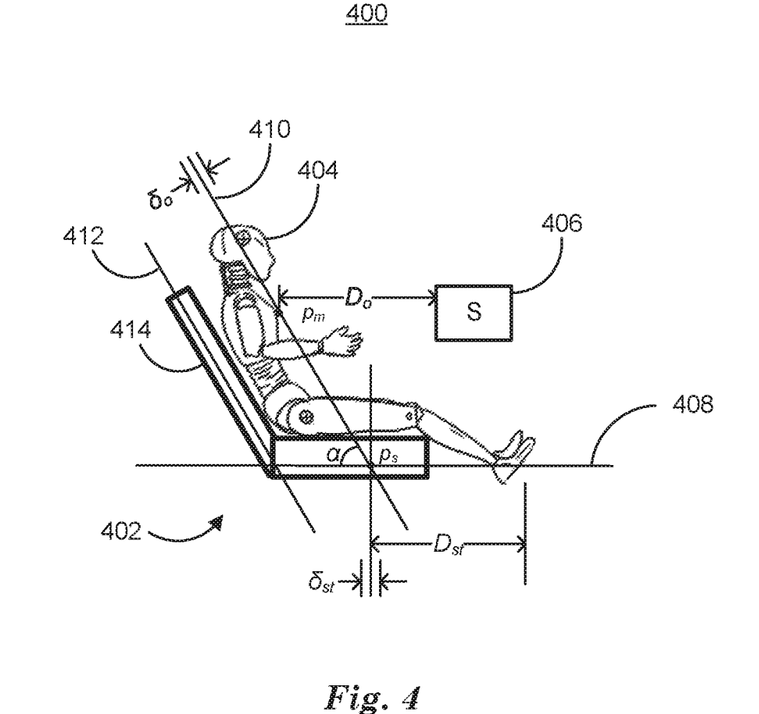
FIG. 4 is a diagram of an example human model in a vehicle seat.

FIG. 4 is a diagram of a vehicle interior 400, including a seat 402 and, seated in the seat 402, an anthropomorphic model 404. Mounted in a dashboard portion of vehicle interior 400, a distance sensor 406 (marked S) can determine a distance $D_o$ from the distance sensor 406 to a point $p_m$ on anthropomorphic model 404 or an occupant seated in seat 402. The distance sensor 406 can be an IR LIDAR 200 as discussed in relation to FIG. 2, or an ultrasonic range detector 300 as discussed in relation to FIG. 3. The distance sensor 406 can be mounted in either a "driver" position or one or more "passenger" positions in the front seating portion of vehicle interior 400, for example, to determine a distance $D_o$ from the dashboard to an occupant or anthropomorphic model, where "driver" and "passenger" positions are defined with respect to traditional occupant behavior in a vehicle 110.

Distance sensor 406 can be operatively connected to computing device 115 included in vehicle 110 that includes vehicle interior 400 to permit computing device 115 to request and receive information from distance sensor 406 including distance $D_o$. Computing device can input distance $D_o$, and, combined with information regarding estimated seat track position and estimated seat angle, determine if the distance $D_o$ fits an adult male anthropomorphic model 404, an adult female anthropomorphic model 404, or no anthropomorphic model 404.

The size and proportions of anthropomorphic model 404 can be based on statistics determined by measuring populations of adult human males and females. The measurements can be divided by sex and grouped in percentiles based on size. The adult male anthropomorphic model can be based on the average size and proportions of the $50^{th}$ percentile adult human male. The adult female anthropomorphic model can be based on the average size and proportions of the $5^{th}$ percentile adult human female, where the percentiles are ranked from smallest to largest size. Assuming that seat 402 is at a mid-track position, and the seat angle $\alpha$ is within a predetermined tolerance of a nominal angle, computing device 115 can determine if a measured distance $D_o$ is consistent with a $50^{th}$ percentile adult male anthropomorphic model 404, a $5^{th}$ percentile adult female anthropomorphic model 404, or no anthropomorphic model 404.

Vehicle seats such as seat 402 can include a seat track that permit the seat 402 to be set at various positions along the track. A seat track position can be defined as the location of reference point $p_s$, on seat 402, along a reference line 408 substantially parallel to the seat track. Computing device 115 can estimate the seat track position $D_{st}$ in FIG. 4 based on measured distance $D_o$ and a parameter b by the equation:

$$D_{st} = \frac{D_o + b}{\cos \alpha} \quad (1)$$

where $D_{st}$ is a seat track position measured with respect to a reference point in vehicle interior 400 and reference point s. Reference point s or seat track position, can be the point on reference line 408 intersected by model line 410. Model line 410 is a line constructed to pass through point $p_m$ at seat angle $\alpha$. The model line 410 is constructed parallel to estimated seat back line 412, with seat angle $\alpha$ being set equal to the estimated angle of seat back line 412. The point $p_s$ is estimated to be where the model line 410 intersects reference line 408.

The parameter b can derived from a $50^{th}$ percentile adult male anthropomorphic model 404 and a $5^{th}$ percentile adult female anthropomorphic model 404 and can be determined by selecting a value measured from the anthropomorphic features of the adult male and adult female anthropomorphic models 404:

$$b = \begin{cases} b_{5th} \\ b_{50th} \\ b_x \end{cases} \quad (2)$$

where $b_{5th}$ refers to a distance derived from features of a $5^{th}$ percentile adult female anthropomorphic model 404, $b_{50th}$ refers to a distance derived from features of a $50^{th}$ percentile adult male anthropomorphic model 404 and $b_x$ refers to a distance that can be determined experimentally by determining a distance $D_o$. Computing device 115 can determine if a vehicle 110 seat is occupied using a seat weight sensor, which measures the weight of an occupant and can acquire information regarding whether the weight matches the weight of a $50^{th}$ percentile adult male anthropomorphic model 404, a $5^{th}$ percentile adult female anthropomorphic model 404, or neither.

Once computing device 115 acquires model information regarding which anthropomorphic model 404 is matched based on a seat weight sensor, computing device 115 can determine if a measured distance $D_o$ is consistent with, i.e., indicates, an anthropomorphic model 404 by determining if the distance $D_o$ is consistent with seat 402 at mid-track position $Dmid_{st}$. Seat 402 mid-track position $Dmid_{st}$ can be measured against a reference point in vehicle interior 400 for a start point of sensing system calibration while the seat is at mid-track position by the equation:

$$Dmid_{st} = \frac{Dmid_0 + b}{\cos \alpha} \quad (3)$$

where $Dmid_0$ is the measured distance between sensor 406 and a point $p_m$ on an anthropomorphic model 404 while the seat 402 is at a mid-track position. The threshold for detection of seat at a mid-track position is described by the equation:

$$f(\text{thresh}) = \begin{cases} 1, & Dmid_{st} - \frac{\delta_{st}}{2} < D_{st} \leq Dmid_{st} + \frac{\delta_{st}}{2} \\ 0, & \text{otherwise} \end{cases} \quad (4)$$

Where $\delta_{st}$ is a predetermined tolerance on seat track position $D_{st}$ that includes measurement error $\delta_0$ related to model line 410. When a seat track position $D_{st}$ is estimated based on a determined distance $D_o$, and the estimated seat track position $D_{st}$ meets threshold conditions in equation (4) ($f(\text{thresh})$ =1), computing device 115 can combine distance $D_o$ with information regarding seat 402 occupancy acquired via sensors 116 included in seat 402 and previously determined information regarding anthropomorphic models 404 to determine if the measured distance $D_o$ is consistent with an adult male anthropomorphic model 404 or an adult female anthropomorphic model 404. If the estimated seat track position $D_{st}$ does not meets threshold conditions in equation (4), ($f(\text{thresh})$=0), distance measure $D_o$ is determined to be consistent with seat 402 not being located at a mid-track position.

When computing device 115 determines that seat 402 is occupied and $D_o$ is consistent with an $50^{th}$ percentile adult male anthropomorphic model 404, a second level retractor force can be applied to passive restraints associated with an occupant of seat 402, for example shoulder and lap safety belts. When computing device 115 determines that seat 402 is occupied and $D_o$ is consistent with, i.e., indicates, an $5^{th}$ percentile adult female anthropomorphic model 404, a first level retractor force can be applied to passive restraints associated with an occupant of seat 402. Retractor force is a force applied to a passive restraint by an actuator controlled by computing device 115 to electro-mechanically, hydraulically, or pneumatically apply a controlled amount of tension to belts that form lap belts and shoulder harnesses included in a passive restraint system and can range from about 2 kilonewtons (kN) to about 4.5 kN. A first level of retractor force can be a low load force and a second level of retractor force can be a high load force. Applying retractor force based on an estimated size and weight of an occupant by matching a distance measure $D_0$ to an anthropomorphic model 404 can optimize the safe and effective operation of a passive restraint system.

Figure 5:
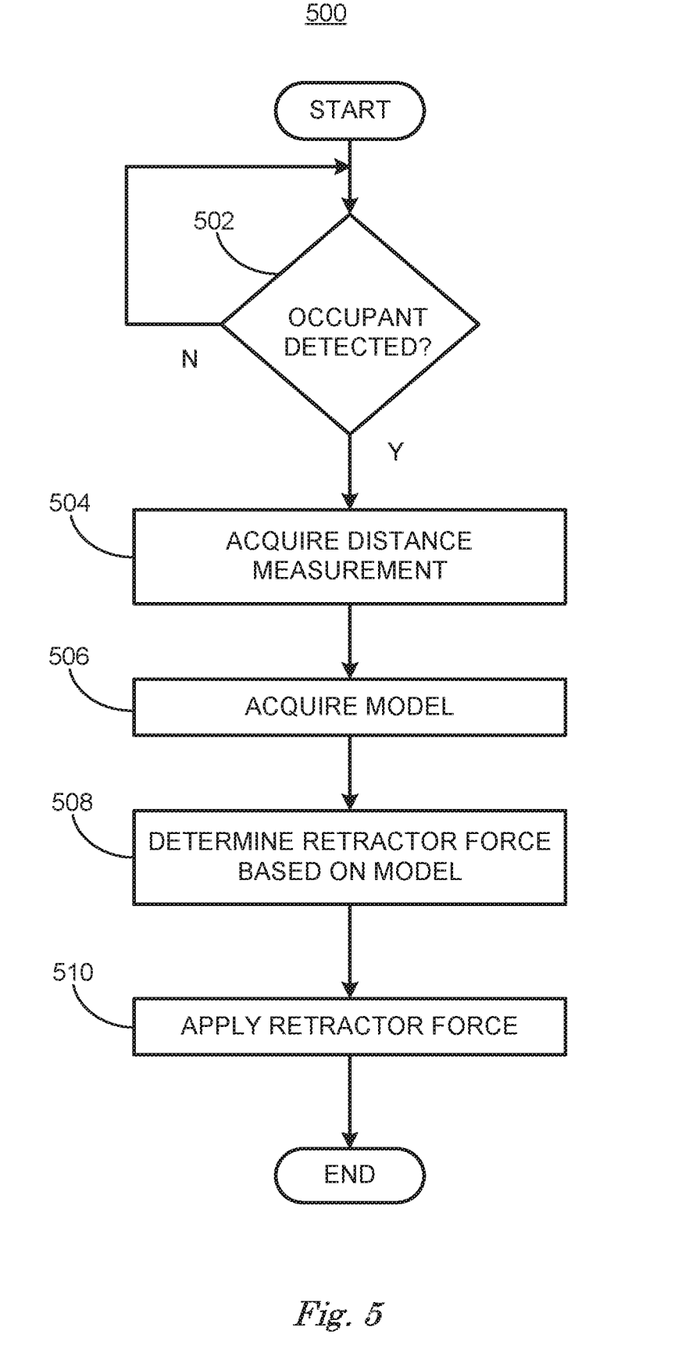
FIG. 5 flowchart diagram of an example process to apply retractor force based on an occupant model.

FIG. 5 is a diagram of a flowchart, described in relation to FIGS. 1-4, of a process 500 for applying retractor force to passive restraints based on a distance measure. Process 500 can be implemented by a processor of computing device 115, taking as input information from sensors 116, and executing instructions and sending control signals via controllers 112, 113, 114, for example. Process 500 includes multiple steps taken in the disclosed order. Process 500 also includes implementations including fewer steps or can include the steps taken in different orders.

Process 500 begins at step 502, in which a computing device 115 in a vehicle 110 can detect an occupant in a seat 402 in a vehicle 110. This can be in response to computing device 115 detecting an ignition switch "ON" event, or any other event indicating that the vehicle 110 can begin moving, for example. At step 504 computing device 115 can direct a distance sensor 406 to determine a distance measure $D_o$ from a dashboard portion of a vehicle interior 400 to an occupant. At step 506 computing device 115 can acquire, i.e. indicates, which anthropomorphic model 404 is matched based on an occupant seat weight sensor, either a $50^{th}$ percentile adult male anthropomorphic model 404, a $5^{th}$ percentile adult female anthropomorphic model 404, or no anthropomorphic model as discussed above in relation to FIG. 4.

At step 508 computing device 115 can determine a retractor force based on the anthropomorphic model 404 determined at step 506 and the distance measure acquired at step 504. If an $5^{th}$ percentile adult female anthropomorphic model 404 is indicated, and (f(thresh)=1), retractor force can be set to a first level. If an $50^{th}$ percentile or above adult male anthropomorphic model 404 is determined at step 506, retractor force can be set to a second level. If no anthropomorphic model 404 is determined at step 506, or (f(thresh) =0), retractor force can be set to a default value. At step 510 the retractor force determined at step 508 can be applied to passive restraints, for example seat and shoulder belts as described above in relation to FIG. 4. Following this step process 500 ends.

Figure 6:
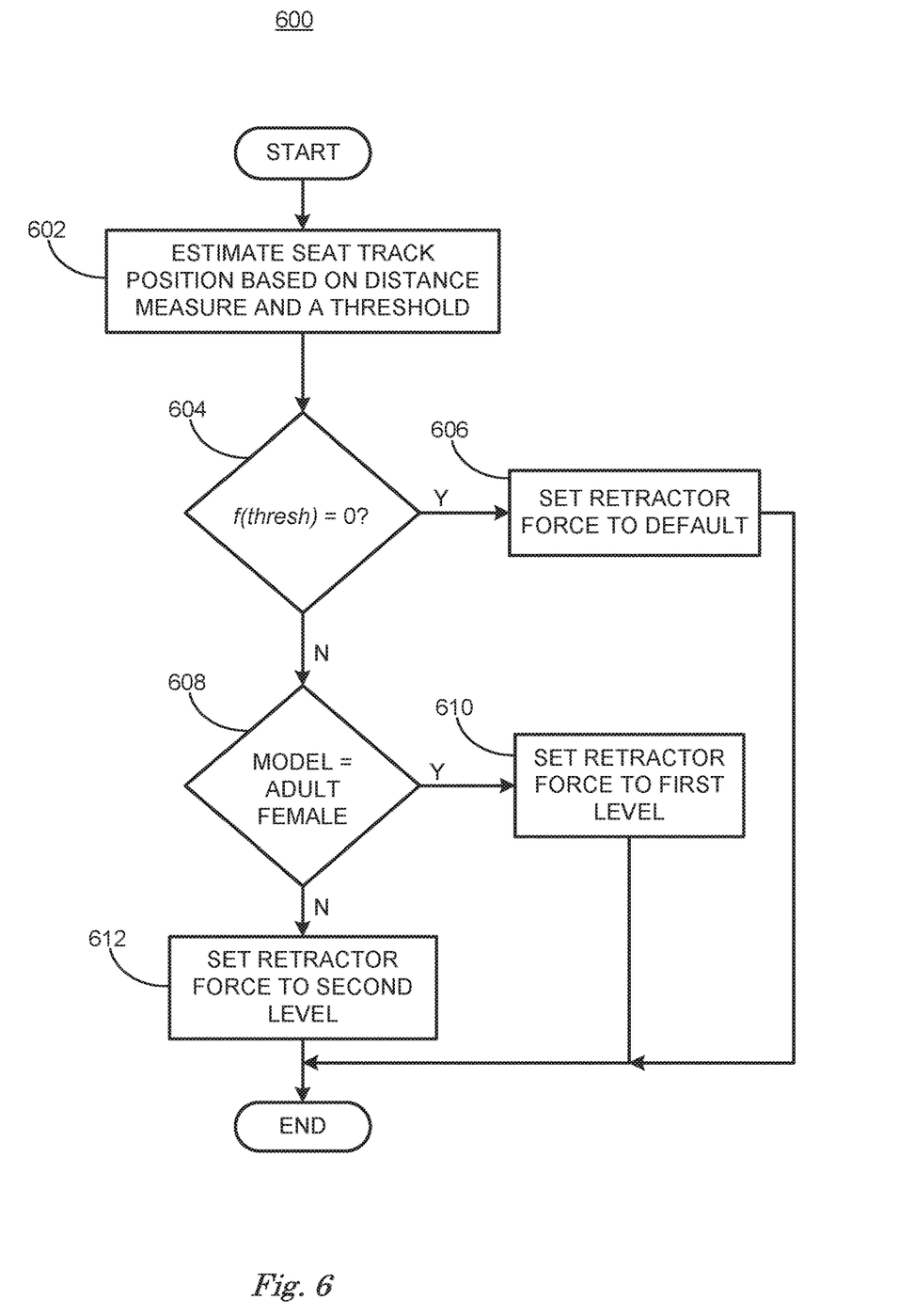
FIG. 6 is a flowchart diagram of an example process to set retractor force based on an occupant model.

FIG. 6 is a diagram of a flowchart, described in relation to FIGS. 1-4, of a process 600 for determining retractor force for passive restraints in a process such as process 500, above. Process 600 can be implemented by a processor of computing device 115, taking as input information from sensors 116, and executing instructions and sending control signals via controllers 112, 113, 114, for example. Process 600 includes multiple steps taken in the disclosed order. Process 600 also includes implementations including fewer steps or can include the steps taken in different orders.

Process 600 begins at step 602, in which computing device 115 in a vehicle 110 can estimate a seat track position $D_{st}$ based on a distance measure $D_o$ and determine a threshold function f(thresh) based on the estimated seat track position $D_{st}$ as discussed above in relation to FIG. 4. At step 604, computing device 115 checks to see if f(thresh)=0. If f(thresh)=0, then seat 402 is not at mid-track position. so process 600 branches to step 606, where retractor force can be set to a default value. At step 604, if f(thresh)=1, distance measure $D_o$ is consistent with, i.e., indicates, an anthropomorphic model 404; therefore, process 600 branches to step 608. If computing device 115 indicates a $5^{th}$ percentile adult female anthropomorphic model 404, process 600 branches to step 610 in which computing device 115 sets retractor force to a first level. At step 608, if computing device 115 indicates a $50^{th}$ percentile or above, adult male anthropomorphic model 404, process 600 branches to step 612 where computing device 115 sets retractor force to a second level. Following this step process 600 ends.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
   determining, for an occupant of a vehicle, an estimated occupant size based on a sensed occupant weight;
   determining an occupant position measurement that is a sensor measurement of a distance from the occupant to a reference point in an interior of the vehicle;
   selecting an anthropomorphic model based on (a) the estimated occupant size and (b) comparing the occupant position measurement to a distance between the reference point in the vehicle interior and a point in a field of view corresponding to a chest portion of the anthropomorphic model;
   determining that a vehicle seat position is at a mid-track position, wherein the mid-track position is determined based on the anthropomorphic model; and
   controlling a vehicle occupant safety device based on the seat position being at the mid-track position for the anthropomorphic model.

2. The method of claim 1, further comprising:
   determining the estimated occupant size based on the anthropomorphic model being one of an anthropomorphic model corresponding to an adult male model or an anthropomorphic model corresponding to an adult female model, and also based on a second anthropomorphic model that is the other of the anthropomorphic model corresponding to an adult male model and the anthropomorphic model corresponding to an adult female model.

3. The method of claim 2, further comprising: determining which anthropomorphic model the occupant position most likely matches based on determining occupant weight, including adult male model, adult female model, or no model.

4. The method of claim 3, further comprising:
   determining the vehicle seat position based on the occupant position measurement and the determined anthropomorphic model.

5. The method of claim 4, further comprising:
   estimating the vehicle seat position including determining whether the occupant position measurement is consistent with the determined anthropomorphic model and a seat located at the mid-track position.

6. The method of claim 1, further comprising: determining the occupant position measurement based on transmitting infrared light or ultrasonic waves from a vehicle dashboard in a direction and with a field of view that intercepts the occupant, at the vehicle seat position.

7. The method of claim 1, wherein controlling the vehicle occupant safety device includes determining retractor force for a passive restraint.

8. The method of claim 2, further comprising:
   determining a retractor force for a passive restraint based on which anthropomorphic model is matched.

9. The method of claim 1, further comprising:
   determining a retractor force for an active restraint to be a default retractor force based on failing to match the anthropomorphic model.

10. The method of claim 5, wherein estimating the vehicle seat position includes determining an estimated seat track position and an estimated seat back angle.

11. A computer apparatus, comprising a processor and a memory, the memory storing instructions such that the processor is programmed to:
    determine, for an occupant of a vehicle, an estimated occupant size based on a sensed occupant weight;
    determine an occupant position measurement according to a sensor measurement made based on a distance between a reference point in a vehicle interior and a point in a field of view corresponding to a chest portion of an anthropomorphic model selected based on the estimated occupant size and occupant weight;
    determine an occupant position measurement that is a sensor measurement of a distance from the occupant to a reference point in the interior of the vehicle;
    select an anthropomorphic model based on (a) the estimated occupant size and (b) comparing the occupant position measurement to a distance between the reference point in the vehicle interior and a point in a field of view corresponding to a chest portion of the anthropomorphic model;
    determine that a vehicle seat position is at a mid-track position, wherein the mid-track position is determined based on the anthropomorphic model; and
    control a vehicle occupant safety device based on the seat position being at the mid-track position for the anthropomorphic model.

12. The apparatus of claim 11, further programmed to determine the estimated occupant size based on the anthropomorphic model being one of an anthropomorphic model corresponding to an adult male model or an anthropomorphic model corresponding to an adult female model, and also based on a second anthropomorphic model that is the other of the anthropomorphic model corresponding to an adult male model and the anthropomorphic model corresponding to an adult female model.

13. The apparatus of claim 12, further programmed to determine which anthropomorphic model the occupant position most likely matches based on determining occupant weight, including adult male model, adult female model, or no model.

14. The apparatus of claim 13, further programmed to determine the vehicle seat position based on the occupant position measurement and the determined anthropomorphic model.

15. The apparatus of claim 14, further programmed to estimate the vehicle seat position including by determining whether the occupant position measurement is consistent with the determined anthropomorphic model and a seat located at the mid-track position.

16. The apparatus of claim 11, further programmed to determine the occupant position measurement based on transmitting infrared light or ultrasonic waves from a vehicle dashboard in a direction and with a field of view that intercepts the occupant, at the vehicle seat position.

17. The apparatus of claim 11, further programmed to control the vehicle occupant safety device including determine retractor force for a passive restraint.

18. The apparatus of claim 12, further programmed to determine a retractor force for a passive restraint based on which anthropomorphic model is matched.

19. The apparatus of claim 11, further programmed to determine a retractor force for an active restraint to be a default retractor force based on failing to match the anthropomorphic model.

20. The apparatus of claim 15, further programmed to estimate the vehicle seat position based on determining an estimated seat track position and an estimated seat back angle.

\* \* \* \* \*